April 30, 1968   P. C. WOLF   3,381,134
MASS FLOW INDICATING MEANS INCLUDING AN INTERFEROMETER SYSTEM
Filed Oct. 5, 1964   2 Sheets-Sheet 1
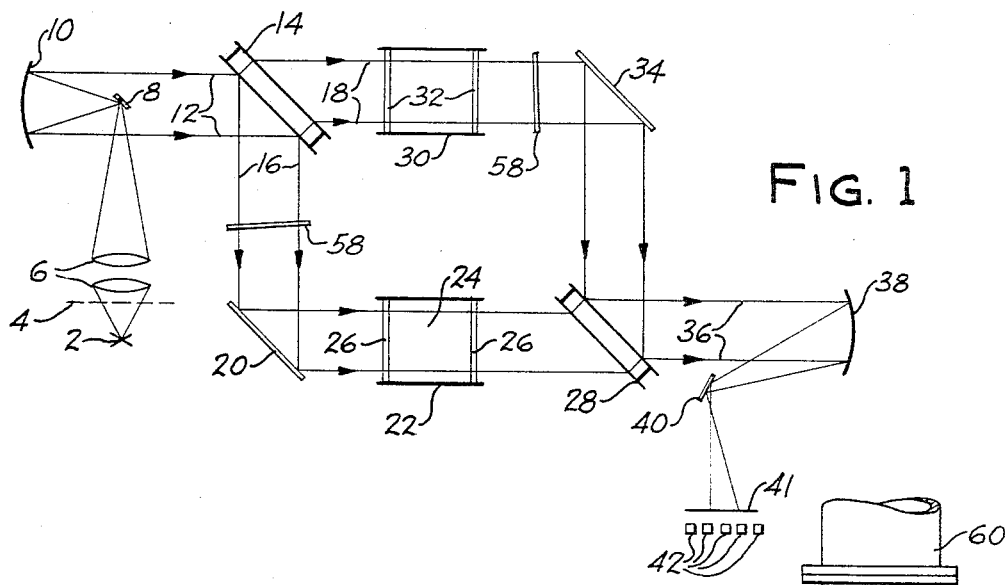
FIG. 1
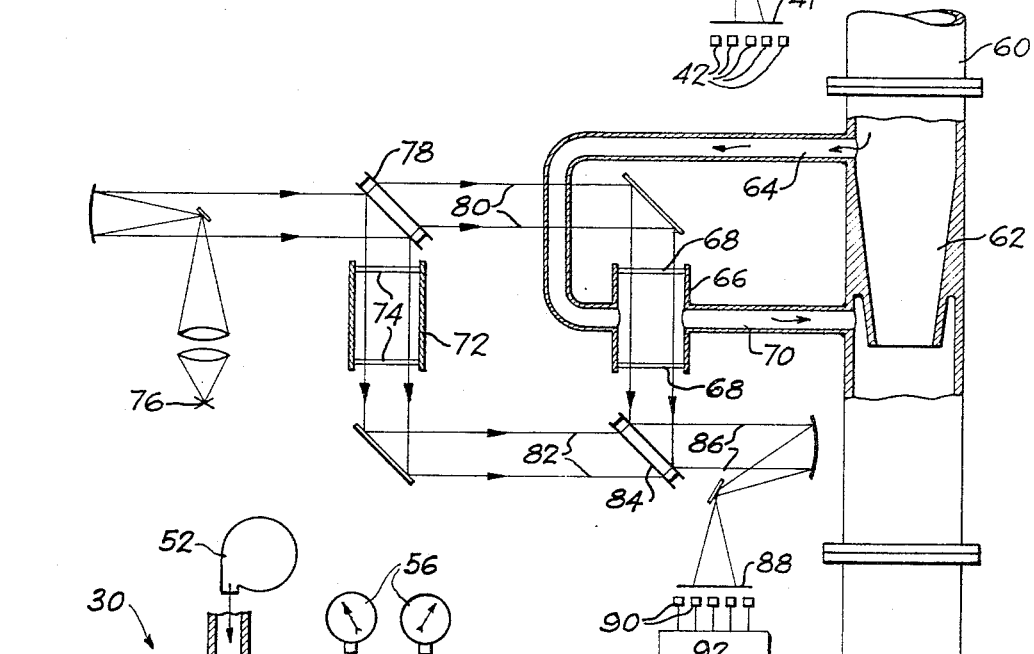
FIG. 3
FIG. 2
PHILIP C. WOLF
INVENTOR
BY *Albert Sperry*
ATTORNEY United States Patent Office
3,381,134
Patented Apr. 30, 1968

3,381,134
MASS FLOW INDICATING MEANS INCLUDING
AN INTERFEROMETER SYSTEM
Philip C. Wolf, 48 Firtree Road,
Levittown, Pa. 19056
Filed Oct. 5, 1964, Ser. No. 401,576
1 Claim. (Cl. 250—218)

ABSTRACT OF THE DISCLOSURE

Mass flow indicating means wherein a density responsive means and a flow responsive means are provided for sensing variations in the density and velocity of flow of fluid through a conduit. One, and preferably both, of such means include an interferometer system having a test chamber through which fluid from the conduit is passed to actuate a sensing means, and the responses from both the density and flow responsive means are impressed on a common indicating device to provide a direct reading of the mass flow of fluid through the conduit.

---

This invention relates to methods and equipment for evaluating and/or controlling the condition of a fluid and is directed particularly to methods and means whereby the density and refractive index of fluids may be determined and utilized rapidly and with a high degree of accuracy without disturbing the condition of the fluid under inspection.

There are many operations and processes in industry and in the laboratory where it is desirable to make a rapid or continuous determination of the properties of fluids with a high degree of accuracy. Thus, in the delivery of gases or fluids through pipe lines, it is often necessary to determine the mass flow of the fluid being delivered or to determine a change in the composition of the fluid at any particular moment or to provide a continuing record of the characteristics of the fluid. Similarly, in carrying out chemical reactions or processes, it is frequently necessary to follow the progress of distillation or cracking operations or determine the completion or state of a chemical reaction and in many instances, it is necessary or desirable to initiate operations to correct, control or terminate the operation under observation.

For these purposes, it is often necessary to determine the density of the fluid flowing through the pipe line or being otherwise handled. However, the methods and equipment heretofore available for this purpose have generally required the use of instruments for measuring the pressure, temperature, composition and other properties of the fluid, and it has then been necessary to resort to the use of gas tables and complex calculations, to sample and analyze the fluid, and perform various other tests or operations before a final determination of the density of the fluid can be attained. As a result, delays and inaccuracies are encountered and the flow or condition of the fluid under examination is often disturbed.

In accordance with the present invention, these and other limitations and objections to methods and equipment of the prior art are overcome and rapid determinations and correction or control of conditions existing in a fluid system can be made with a degree of accuracy far exceeding that heretofore attainable.

For this purpose, the present invention utilizes an optical interferometer to indicate and measure changes or variations in the density of a fluid whereby determinations of temperature and pressure and the use of hydrometers and other gauges or testing means can be eliminated. Moreover, determination of the density of a fluid and the amount and character of any changes in density which may occur can be made instantly without resort to the use of gas tables and complex mathematical calculations or introducing errors due to losses or inaccuracies in making any measurements and without disturbing the flow or other conditions of the fluid being examined. The density is instead indicated by a shift in the location of interference bands of light on a screen or on a sensing or other scanning device with a degree of accuracy which cannot be approached when employing testing means relying upon physical contact with the fluid under observation. Moreover, the present invention renders it possible to make an accurate determination of the density of gases at high velocity and at high temperatures and pressures or under other conditions wherein the relationship of density, pressure and temperature is very complex and based only upon empirical relationships.

In the preferred embodiments of the invention herein shown and described, the equipment utilizes a Mach-Zehnder, or four plate, type of interferometer and a test beam of light is passed through the fluid under observation or test while a reference beam of light is passed through a fluid in a control or reference chamber for combination with the test beam of light to develop an interference beam which is projected onto a screen or sensing means. In some instances, the density of the fluid in the reference chamber may be controlled or multiple reference chambers and interferometer systems employed to indicate what condition such as the pressure, temperature, composition or the like has produced a change in density of the fluid in the test chamber. Moreover, when a sensing means is employed, it may be utilized to indicate the character and amount of any density change and may be employed to produce a record or to actuate elements designed to compensate, correct, terminate or otherwise control the flow or condition of the fluid under test.

Accordingly, the principal objects of the present invention are to increase the accuracy and simplify the operations employed in determining the density of fluids; to provide improved methods and means for determining the mass flow of a fluid in a conduit; to simplify the operations and increase the accuracy in evaluating and controlling chemical reactions and the like; and to provide novel means for observing and evaluating the properties of a fluid in a test zone.

A specific object of the invention is to provide equipment utilizing a Mach-Zehnder type interferometer with a reference chamber through which the reference beam of light is passed for combination with a test beam of light passed through a test zone and to employ the resulting interference beam produced for determining or controlling a condition of the fluid in the test zone.

These and other objects and features of the present invention will appear from the following description thereof wherein reference is made to the figures of the accompanying drawing.

In the drawings:

FIG. 1 is a diagrammatic illustration of a Mach-Zehnder, four-plate interferometer system embodying the present invention;

FIG. 2 is an enlarged view of a typical form of reference chamber adapted for use in the practice of the present invention;

FIG. 3 is a diagrammatic illustration of one form of equipment wherein the present invention is employed.

Figure 4:
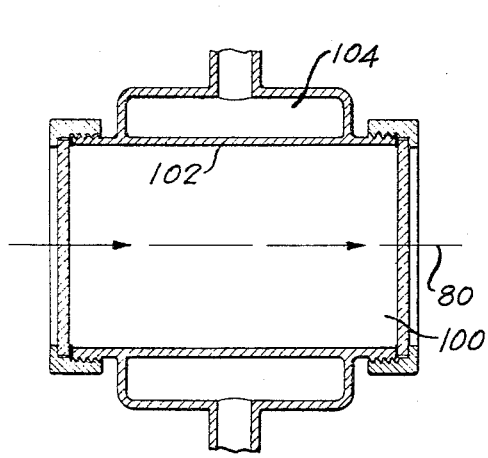
FIGS. 4, 5 and 6 are diagrammatic illustrations of alternative forms of equipment embodying the present invention.

In that form of the invention chosen for purposes of illustration in FIG. 1, the system embodies a light source 2 which may be provided with a filter 4 and condenser lenses 6 for focusing light from the source 2 on the mirror 8. The light from this mirror is directed onto a concave mirror 10 for forming a beam of parallel rays of light 12 which pass to a semi-transparent mirror or light splitter 14. The splitter 14 is preferably designed to reflect approximately one-half of the light to form the test beam 16 while transmitting the remainder of the light to form the reference beam 18.

The test beam 16, after being reflected from the mirror 20, passes through the test zone or chamber 22 which may be a pipe line, wind tunnel, gas or liquid conduit or reaction chamber, or a free or open zone or may be of any other desired type. The test chamber generally embodies a space 24 for receiving or confining the medium under test and has transparent windows 26 at opposite sides thereof through which the test beam of light passes in traversing the test chamber and the medium therein undergoing examination. The test beam, on emerging from the test chamber or zone, passes to the beam combining means 28 which may be a semi-transparent mirror similar to the light splitter 14.

The reference beam of light 18 passes from the splitter 14 through the reference chamber 30 which preferably has transparent windows 32 having essentially the same thickness and optical characteristics as the windows 26 of the test chamber 22. The reference beam of light 18 issuing from the reference chamber 30 passes to the mirror 34 and is reflected thereby onto the beam combining means 28 which serves to transmit the test beam and reflect the reference beam together to form an interference beam 36.

The interference beam may be utilized as necessary to obtain the desired image or representation for inspection, analysis or sensing. As shown in FIG. 1, the interference beam 36 passes to a condensing mirror 38 and reflector 40 for focusing on a screen or photographic film 41 or a series of sensing elements 42 such as photoelectric cells or the like.

The reference chamber 30 employed may be of any suitable form or type desired or necessary for any particular purpose or conditions required. As shown in FIG. 2, the reference chamber is in the form of a cylindrical casing 44 having the glass or transparent windows 32 mounted on the opposite ends thereof. The casing may be provided with insulation as shown at 46 and have fluid inlet and outlet connections 48 and 50 respectively. The inlet connection 48 may communicate with a pump 52 and the outlet connection 50 may be provided with a valve 54. The reference chamber further may be provided with a pressure guage, a thermometer, and any other means desired, as shown at 56, for determining and controlling the condition of a medium within the reference chamber. The pump 52 may be a vacuum pump, pressure pump or feed pump for maintaining the medium within the reference chamber under the desired pressure and valve 54 in the outlet connection 50 may be opened or closed or be of a pressure responsive or metering type for cooperation with the pump 52 to establish, maintain or vary the static pressure or the flow of fluid within the reference chamber.

The fluid within the reference chamber 30 may be air, oxygen, nitrogen, helium, natural gas, liquid, vapor or the like and it may be maintained under any known or desired pressure, temperature, or density to establish a standard or reference index of refraction to which the index of refraction or density of the medium in the test chamber 22 is to be compared. Moreover, since the reference fluid will, in most cases, be maintained under constant or known conditions of pressure, temperature and the like, the use of conventional gauges, thermometers, thermocouples and the like in association with the reference chamber will not impair the accuracy of the determinations made.

The medium in the reference chamber, or the test chamber, or both, may be liquids if desired; and when the invention is employed in studying or controlling the flow of a liquid, a chemical process such as a distillation, polymerization, cracking, or any other method wherein the composition or density, and, therefore, the index of refraction of the liquid is significant or may undergo change, the use of various liquids in the reference chamber may be preferred.

The equipment should, of course, be provided with suitable adjustments or compensating means for the light beams to establish paths of light of equal optical length. Therefore, the mirrors and splitter plates are preferably mounted for movement and, if desired, additional compensating plates may be positioned in the path of either or both the test beam 16 and the reference beam 18 as shown at 58.

In employing the invention illustrated generally in FIGS. 1 and 2 for determining the mass flow of gases or liquids through a pipe line, the equipment may be applied as shown more fully in FIG. 3. For this purpose, the pipe line 60 may be provided with a venturi or standard orifice 62 through which a known volume and mass of fluid will flow in unit time under known conditions as established by calibration. A by-pass tube 64 is connected to the pipe line 60 through which the fluid is passed from the pipe line to a test chamber 66 having transparent windows 68 in opposite ends thereof. The fluid from the test chamber is returned to the pipe line 60 through a return conduit 70 whereby the fluid in the test chamber will possess the same density or a density directly related to that of the fluid flowing through the pipe line 60.

A reference chamber 72 is located near the test chamber and provided with transparent windows 74 in the ends thereof and is charged with a fluid having a known or fixed density and, therefore, a known index of refraction.

The interferometer used in combination with the test chamber 66 and reference chamber 72 may then be provided with a light source 76 and a light splitter 78 for producing a test beam 80 and a reference beam 82. The test beam is passed through the test chamber and the reference beam is passed through the reference chamber. The two light beams after traversing paths of essentially equal optical length are combined by the light combining plate or means 84 to produce the interference beam 86. The latter beam serves to produce interfering bands of light which are then projected onto scanning means that serves as a density indicating device. Such scanning means may consist of a screen 88 or sensing means 90 or the like.

With this construction, the position and spacing of the interference bands of light on the scanning means can be adjusted initially to correspond to the density of the fluid in the reference chamber or in the pipe line when the fluid has a predetermined normal or standard density through the venturi or orifice 62. Thereafter, any change or deviation in the density of the fluid flowing through the pipe line 60 from the normal or predetermined level will give rise to a change in the density of the fluid flowing through the test chamber 66 of the interferometer system. When such a change occurs, the interfering bands of light will shift from their initial position on the scanning means. The amount and direction of such shifting of the interference bands will be directly proportional to the change in fluid density and accordingly serve to provide a direct and extremely accurate indication of such change from which characteristics of the fluid passing through pipe line 60 can be readily determined.

When the scanning means embodies sensing elements such as a series of photoelectric cells 90, the interference bands of light may be focused on the photoelectric cells 90 in such a manner as to render selected or successive cells in the series responsive upon change in the position of the interference bands with respect thereto. The photoelectric cells in turn may be electrically connected to computing and/or control means indicated generally at 92. If computing means are employed, they may serve to print a continuous record of the mass flow of the gas through the pipe line 60. If control means are actuated by the photoelectric cells, the control means may actuate pumps, valves, by-pass means or the like to compensate for the changes in density of the gas or to rectify, or vary any condition or to increase, decrease or terminate the flow of the gas in the pipe line 60.

When the fluid under examination in the pipe line 60 is an incompressible liquid (and most liquids are substantially incompressible), any change in the density and therefore the refractive index of the liquid will be indicated immediately on the screen 88 and scanning device 90. Accordingly, if successive charges or "slugs" of liquid, such as gasoline and fuel oil, are passed through the pipe line 60, the arrival of a liquid of different density from that for which the equipment has been initially adjusted at the point where the equipment is located, will cause the interference bands to be displaced from their original positions. The amount and character of the change in density of the liquid may then be noted on the screen 88 whereas the scanning or photoelectric means 90 will be actuated and may energize control or computing means 92 to divert the liquid of different density to a different tank or location or perform any other operation desired.

In some cases, the liquid flowing through the line 60 may be a distillate or the product of a cracking, polymerization or other chemical reaction, and in such situations, the change in density of the liquid as the process proceeds may be utilized to terminate, alter or control the operation or reaction through the actuation of the scanning or sensing means 90 and control mechanism 92. As a result, continuous, immediate and extremely accurate monitoring of a chemical reaction or process can be effected without resort to physical contact with the liquid flowing through the pipe line and equipment.

When the fluid under observation in the equipment of FIG. 3 is a gas, its density may vary with the pressure and temperature thereof. Under such circumstances, the changes in density due to either pressure or temperature or both can be recognized and, if desired, can be eliminated from consideration by suitable means. Thus, as shown in FIG. 4, the reference chamber 100 may be employed in the equipment of FIG. 3. As illustrated in FIG. 4, the casing 102 of the reference chamber may be surrounded by a chamber 104 through which the gas passing to or from the test chamber is circulated. The casing 102 is formed of material of high heat conductivity whereby the gas or fluid in the reference chamber will be caused to assume the same temperature as the gas flowing through the test chamber. In this way, changes in the density of the gas under observation in the test chamber resulting from changes in the temperature thereof will result in corresponding or related changes in the density of the fluid in the reference chamber.

When using a reference chamber of the type shown in FIG. 4 in the equipment of FIG. 3, any change in position or shifting of the interference bands with respect to the screen 88 or scanning means 90 will indicate a change in gas density due to a change in pressure of the gas flowing through the pipe line 60, provided, of course, the composition of the gas does not change. The scanning means may be caused to actuate elements 90 which may be recording instruments, computing equipment, means operable to correct or change the pressure of the gas in the pipe line, or any other desired mechanism.

Figure 5:
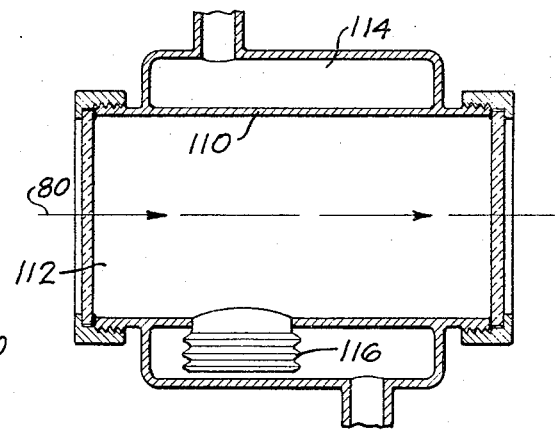

In the further alternative application of the present invention shown in FIG. 5, casing 110 of the reference chamber 112 is provided with an outer chamber 114 through which gas flowing to or from the test chamber of the equipment of FIG. 3 may be passed. The reference chamber 112 is provided with a bellows 116 or other means for subjecting the reference fluid in the reference chamber to the same pressure and pressure variations as the gas in the test chamber. With this construction, the pressure and pressure changes to which the gas under observation is subjected will be the same or related to changes in the pressure to which the fluid in the reference chamber are subjected. As a result, changes in the density and refractive index of the gas and fluid in the test and reference chambers will be similar or related so that any shifting in the position of the interference bands with respect to the screen 88 and scanning means 90 will indicate density changes resulting from a change in temperature or composition of the gas flowing through the pipe line. Moreover, if the casing 110 of the reference chamber is not insulated and formed of material of high heat conductivity, as described above with reference to FIG. 4, the influence of both temperature and pressure changes on the gas will be eliminated. The equipment of FIG. 3 can then be used to obtain an immediate and accurate indication of any change in composition of the gas flowing through the pipe line 60.

Figure 6:
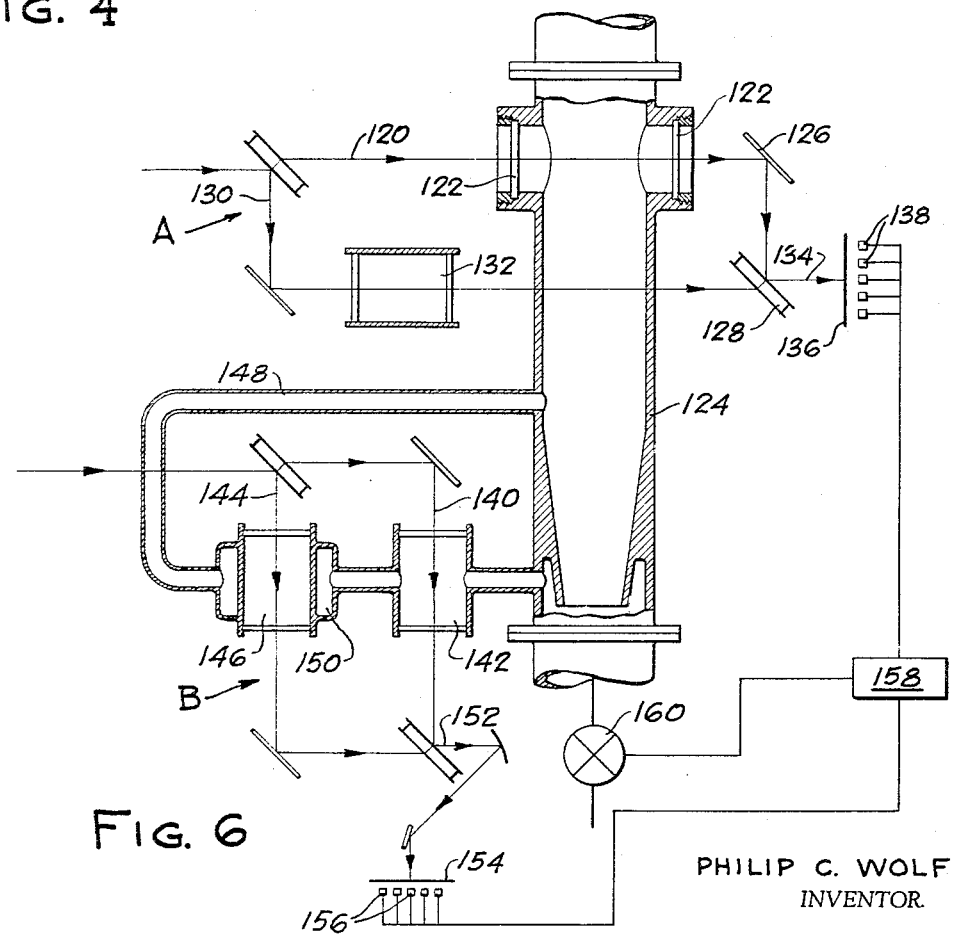

In some applications of the present invention, a plurality of optical systems may be employed as illustrated diagrammatically in FIG. 6. As there shown, the interferometer system A serves to direct a test beam of light 120 through windows 122 mounted directly in the conduit 124 so as to pass therethrough to mirror 126 and the beam combining means 128. The reference beam of light 130 passes through a reference chamber 132 containing a fluid of known density and index of refraction and thence to the beam combining means 128 (without passing through the conduit 124). The interference beam 134 thereby produced is projected onto screen 136 and scanning means 138 which may embody a plurality of photoelectric cells. The interference beam 134 will thereby provide a comparison between the density of the fluid flowing through the conduit 124 and the fluid in comparison chamber 132.

At the same time, an interferometer system B is arranged to direct a test beam of light 140 through a test chamber 142 and a reference beam of light 144 through a reference chamber 146. However, the reference chamber 146 is of the type shown in FIG. 4 and the fluid under inspection flows through a by-pass 148 to the outer chamber 150 of reference chamber 146 and thence to the test chamber 142 and back to conduit 124. The interferometer system B thereby serves to produce an interference beam 152 which is projected onto screen 154 and photoelectric cells 156. Since the temperature of the fluid in reference chamber 146 and the gas in test chamber 142 is thus the same, the density differences influencing the test and reference beams of light in interferometer system B will correspond to differences in pressure of the test gas and reference fluid. The density change recorded by interferometer A can thus be attributed to the influence of changes in pressure only (assuming the composition of the gas remains unchanged) since the influence of changes in temperature has been eliminated by the use of the temperature equalizing means of reference chamber 146. Furthermore, if the reference chamber 146 is of the type shown in FIG. 5 wherein the fluid in the reference fluid is maintained at both the same temperature and the same pressure as the fluid in conduit 124, the density changes recorded by interferometer A may be used to indicate changes in composition of the fluid under examination.

The record, impulses or output of the scanning means 138 and 156 of the interferometer systems A and B respectively can in any case be combined or opposed electrically or otherwise by integrating means 158 to actuate mechanism such as a computer, recorder or the like or control means such as the valve 160 in conduit 124.

In a similar way, three or more optical systems may be employed when desired with the fluid in the reference chamber or each system being subjected to a selected condition of the fluid in conduit 124 to obtain an indication or measurement of the density changes resulting from other conditions or parameters influencing the density and refractive index of the fluid under examination.

Equipment embodying the present invention also has many other uses and applications. The light source employed may be monochromatic light or a laser, although white light may also be used. In some instances, particularly in examining dark or seemingly opaque fluids, a source of infra-red light may be employed while in other applications of the invention, it may be desirable to use a source of ultra-violet light since the electromagnetic form of the beams producing the interference bands can be varied as desired in the practice of the present invention.

While the invention has been illustrated and described above with particular reference to interferometer systems of the Mach-Zehnder type, the invention is also adapted for use with other types of interferometers. It is also possible to obtain a simultaneous or alternative Schlieren image of an object under test by the use of suitable and known modifications of the four-plate optical system employed in the equipment described.

In view thereof, it will be apparent that the present invention is capable of many and varied uses and modifications in addition to those herein described. Accordingly, it should be understood that the particular embodiments of the invention shown in the drawings and described above and the uses and applications thereof referred to are intended to be illustrative only and are not intended to limit the scope of the invention.

I claim:

1. Means for use in determining the mass flow of a fluid through a conduit comprising fluid density responsive means embodying an interferometer system provided with a test beam of light and a reference beam of light, a test chamber through which fluid flowing through said conduit is circulated, said test chamber having transparent windows through which the test beam of light of the interferometer system is passed, a reference chamber containing a fluid possessing known optical characteristics through which the reference beam of said interferometer system is passed, means for combining said test and reference beams of light to form an interference beam, sensing means to which said interference beam is passed responsive to variation of said interference beam upon change in the density of the fluid flowing through said conduit and test chamber, a restriction in said conduit through which said fluid is passed, flow responsive means including a second interferometer system having a test chamber communicating with said conduit at opposite sides of said restriction and containing a gas maintained under a pressure variable in response to changes in the velocity of flow of fluid through said restriction, said second interferometer system including a reference chamber and means forming reference and test beams traversing the reference and test chambers, means for combining the latter reference and test beams to form an interference beam, sensing means responsive to variations in the latter interference beam, and common means upon which the responses of the sensing means of both interferometer systems are impressed to provide a direct reading of the mass flow of fluid through said conduit.

References Cited

UNITED STATES PATENTS

| | | | |
|---|---|---|---|
| 1,977,359 | 10/1934 | Styer | 250—218 X |
| 2,427,996 | 9/1947 | Seaman | 250—218 X |
| 2,462,292 | 2/1949 | Snyder | 88—14 |
| 2,570,064 | 10/1951 | Meinert | 250—218 X |
| 2,857,803 | 10/1958 | Reinecke et al. | 250—218 X |
| 2,885,922 | 5/1959 | Miller | 250—218 X |
| 3,013,465 | 12/1961 | Collyer | 88—14 |

OTHER REFERENCES

Jenkins et al.: Fundamentals of Optics; McGraw-Hill, 1957; pp. 256 to 259.

RALPH G. NILSON, *Primary Examiner.*

M. A. LEAVITT, J. D. WALL, *Assistant Examiners.*